No. 740,656. PATENTED OCT. 6, 1903.
F. D. HOWE.
DRIVING MECHANISM FOR MOTOR VEHICLES.
APPLICATION FILED MAY 5, 1903.
NO MODEL.

Witnesses:
Raphaël Netter
A. S. Dunham

Frank D. Howe, Inventor
by Kerr, Page + Cooper, Att'ys.

No. 740,656.

Patented October 6, 1903.

UNITED STATES PATENT OFFICE.

FRANK D. HOWE, OF BAYSIDE, NEW YORK, ASSIGNOR TO GIBBS ENGINEERING AND MANUFACTURING COMPANY, OF NEW YORK, N. Y., A CORPORATION OF NEW YORK.

DRIVING MECHANISM FOR MOTOR-VEHICLES.

SPECIFICATION forming part of Letters Patent No. 740,656, dated October 6, 1903.

Application filed May 5, 1903. Serial No. 155,714. (No model.)

*To all whom it may concern:*

Be it known that I, FRANK D. HOWE, a citizen of the United States, residing at Bayside, city of New York, county of Queens, State of New York, have invented certain new and useful Improvements in Driving Mechanism for Motor-Vehicles, of which the following is a specification, reference being had to the drawings accompanying and forming part of the same.

My invention relates to gear mechanism between the motor or motors and the driving-wheels of automobiles, and has for its chief object to provide a more yielding suspension for the motor, so that the gear-teeth will not be subjected to severe shocks on starting the vehicle from rest.

Other advantages incident to my invention will be apparent from the following description.

It consists, essentially, of means for yieldingly suspending the motor adjacent to but not upon the driving-wheel axle and connections from the motor to the driving-wheels.

Figure 1:
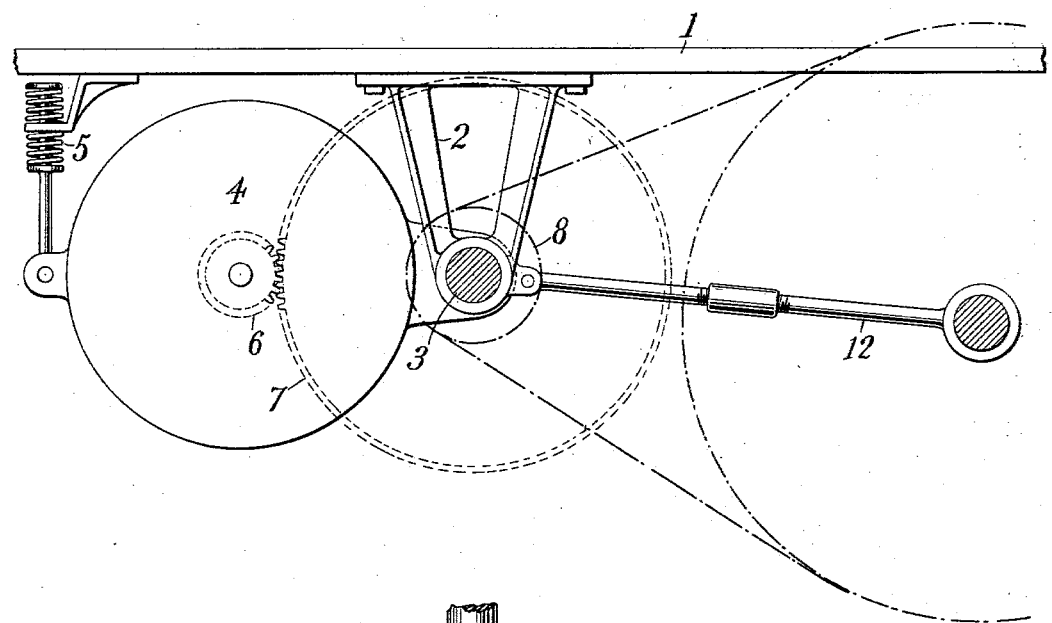
Figure 2:
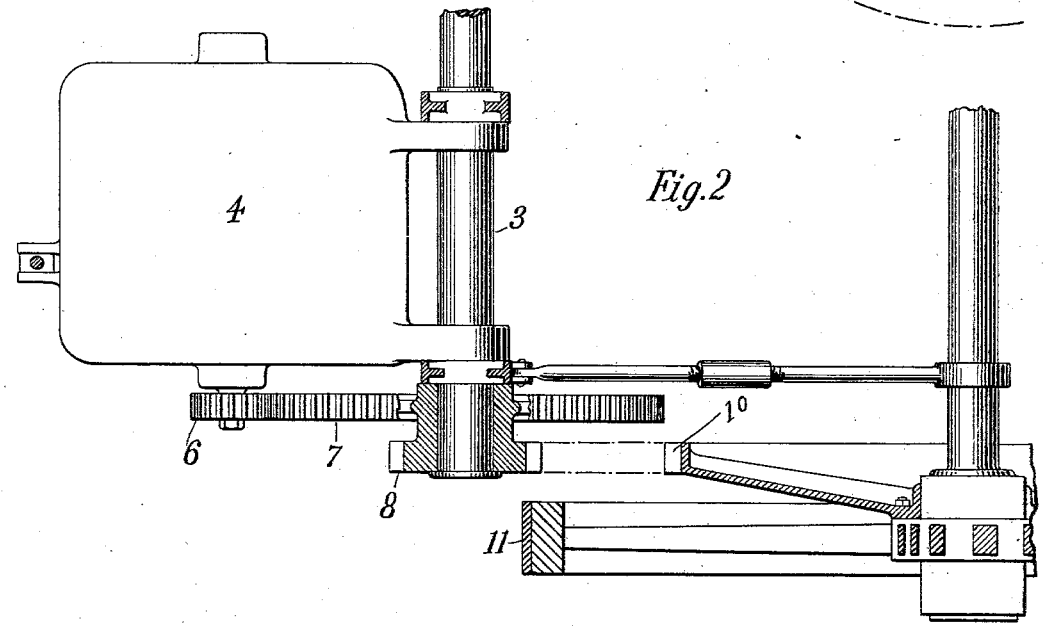

Referring now to the drawings, Figure 1 is a side elevation of a convenient embodiment of my invention. Fig. 2 is a plan view of the above, partly in section.

The platform or body of the vehicle is indicated by 1. Depending therefrom is a pair of brackets, one of which is shown at 2 carrying a pipe or bar 3, extending across the vehicle. Suitably mounted upon the cross-bar is a motor or motors 4, suspended at its other side from the platform by convenient spring devices 5. A pinion 6 on the motor-shaft meshes with a spur-gear 7 on the pipe or bar 3. The spur-gear is connected with a sprocket 8, which by means of a chain 9 drives a sprocket 10 on the driving-wheel 11. A rod 12 insures that the brackets and driving-axle shall always be the proper distance apart by preventing unusual or sudden strains from displacing either of them. If gearing is used to transmit the motion of the spur-wheel 7 to the driving-wheel, the rod would preferably be solid throughout; but with sprockets and chain, as illustrated, a turnbuckle or other equivalent device can be included for the purpose of tightening the chain when required, as will be readily understood.

The mechanism described possesses the advantage of supporting the motor, so that when the shaft of the same starts to rotate from a position of rest the teeth of the pinion and the intermeshing spur-wheel will come together with a yielding blow, the shock of the impact being taken up by the springs 5. The danger of breaking teeth in the former devices is especially great when the gears have been so worn that the intermeshing teeth when at rest are separated a considerable distance each from the other, in some instances as much as a quarter of an inch. The shock under these circumstances is very great. In my arrangement, however, the flexibility resulting from the chain 9 and the springs 5 is sufficient to reduce the shock to the minimum under all circumstances.

The mechanism here specifically described is of course typical merely of my invention, which may be embodied in widely-varying forms without departing from its proper scope.

What I claim is—

1. In a self-propelled vehicle, the combination with the driving-wheels, of a motor-support adjacent the axle of the driving-wheels, a motor suspended on said support wholly independent of the axle, spring devices connected to hold the motor in position thereon, a spur-wheel, means for driving the spur-wheel from the motor, and means for communicating the motion of the spur-wheel to the driving-wheels, as set forth.

2. In a self-propelled vehicle, the combination with the driving-wheels, of a motor-support adjacent the axle of the driving-wheels, a motor suspended by one side on the support, spring devices from which the other side of the motor is suspended, a spur-wheel on the support, means for driving the spur-wheel from the motor, and means for communicating the motion of the spur-wheel to the driving-wheels, as set forth.

3. In a self-propelled vehicle, the combination with the driving-wheels, of a motor-support adjacent the axle of the driving-wheels, a motor having a rotating shaft, suspended by one side on the support, spring devices yieldingly supporting the other side of the motor from the vehicle, a pinion on the motor-shaft, a spur-wheel on the motor-support meshing with the pinion, a sprocket-wheel connected with the spur-wheel and rotating therewith, a sprocket on the driving-wheel, and means for driving the latter from the former, as set forth.

FRANK D. HOWE.

Witnesses:
M. LAWSON DYER,
S. S. DUNHAM.